US008051682B1

(12) United States Patent
Hull et al.

(10) Patent No.: US 8,051,682 B1
(45) Date of Patent: Nov. 8, 2011

(54) APPARATUS AND METHOD FOR MAKING GLASS PREFORM WITH NANOFIBER REINFORCEMENT

(75) Inventors: John Ralph Hull, Sammamish, WA (US); Mark S. Wilenski, Mercer Island, WA (US); Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/791,837

(22) Filed: Jun. 1, 2010

(51) Int. Cl.
*C03B 5/00* (2006.01)
(52) U.S. Cl. ............. 65/347; 65/134.1; 65/441; 65/404; 373/27
(58) Field of Classification Search .................. 65/336, 65/337, 347, 340, 529, 425, 421, 441, 404, 65/134.1, 134.2; 373/27, 29, 30, 36, 41, 373/156
See application file for complete search history.

(56) References Cited

U.S. PATENT DOCUMENTS

| | | | |
|---|---|---|---|
| 4,738,938 A * | 4/1988 | Kunkle et al. .................. 501/72 |
| 4,820,329 A * | 4/1989 | Gunthner ..................... 65/134.4 |
| 5,109,389 A * | 4/1992 | Stenzel ........................ 373/156 |
| 5,401,289 A * | 3/1995 | France et al. ..................... 65/379 |
| 6,090,227 A * | 7/2000 | Leichtfried et al. .......... 148/423 |
| 7,061,964 B2 * | 6/2006 | Kawasaki et al. ................. 373/2 |
| 2008/0104998 A1 * | 5/2008 | Tivey et al. ................... 65/134.8 |
| 2008/0202287 A1 * | 8/2008 | Da Cruz et al. .............. 75/10.34 |
| 2009/0104386 A1 | 4/2009 | Barrera et al. |
| 2009/0181211 A1 | 7/2009 | Lang et al. |
| 2009/0220409 A1 | 9/2009 | Curliss et al. |
| 2009/0226692 A1 | 9/2009 | Wilenski et al. |
| 2009/0226709 A1 | 9/2009 | Wilenski et al. |
| 2010/0011702 A1 | 1/2010 | Wilenski et al. |
| 2010/0075090 A1 | 3/2010 | Wilenski et al. |

FOREIGN PATENT DOCUMENTS

CN 1872752 A * 12/2006
JP 01119522 A * 5/1989

OTHER PUBLICATIONS

Avigal, et al., "Growth of Aligned Carbon Nanotubes by Biasing During Growth", Applied Physics Letters, Apr. 16, 2001, pp. 2291-2293, vol. 78, No. 16, American Institute of Physics.
Bao, et al., "Electric Field Induced Growth of Well Aligned Carbon Nanotubes from Ethanol Flames", Nanotechnology, Jan. 30, 2006, pp. 1016-1021, vol. 17, Institute of Physics Publishing.
Benedict, et al., "Static Polarizabilities of Single-Wall Carbon Nanotubes", Physical Review B, Sep. 15, 1995, pp. 8541-8549, vol. 52, No. 11, The American Physical Society.

(Continued)

*Primary Examiner* — Matthew Daniels
*Assistant Examiner* — Lisa Herring

(57) ABSTRACT

There is provided an apparatus and method for making a glass preform with nanofiber reinforcement. The apparatus comprises a container for melting one or more glass components in a mixture comprising the glass components and one or more nanofibers. The container has an opening that allows escape of any gas released from the glass components when the glass components are melted in the container. The apparatus further comprises one or more heating elements for heating the container. The apparatus further comprises one or more electric field devices, positioned exterior to the glass components, that create an electric field in a volume of the mixture in order to orient the nanofibers within the glass components when the glass components are melted in the container.

15 Claims, 12 Drawing Sheets

OTHER PUBLICATIONS

Bower, et al., "Plasma-Induced Alignment of Carbon Nanotubes", Applied Physics Letters, Aug. 7, 2000, pp. 830-832, vol. 77, No. 6, American Institute of Physics.

Chhowalla, et al., "Growth Process Conditions of Vertically Aligned Carbon Nanotubes Using Plasma Enhanced Chemical Vapor Deposition", Nov. 15, 2001, pp. 5308-5317, vol. 90, No. 10, American Institute of Physics.

Choi, et al., "Fully Sealed, High-Brightness Carbon-Nanotube Field-Emission Display", Nov. 15, 1999, pp. 3129-3131, vol. 75, No. 20, American Institute of Physics.

Zhang, et al., "Electric-Field-Directed Growth of Aligned Single-Walled Carbon Nanotubes", Nov. 5, 2001, pp. 3155-3157, vol. 79, No. 19, American Institute of Physics.

* cited by examiner

APPARATUS AND METHOD FOR MAKING GLASS PREFORM WITH NANOFIBER REINFORCEMENT

BACKGROUND

1) Field of the Disclosure

The disclosure relates generally to glass preforms used in fiber drawing, and more particularly to glass preforms with nanofiber reinforcement.

2) Description of Related Art

Composites consisting of glass or carbon fibers in a plastic matrix are used in a wide variety of mechanical structures. It is desirable to use fibers with high tensile strength and modulus in these composites as this enables the structure to be made lighter and often less expensively. It is known in the art that glass fiber with carbon nanofiber (CNF) or carbon nanotube (CNT) reinforcement provides a higher strength fiber than glass fiber by itself. Typically, the glass fiber has a diameter of 10 microns to 20 microns and lengths of many meters. The nanofiber reinforcement might have a diameter of 100 nm (nanometer), and a length of 20 micron. The volume fraction of nanofiber in the glass fiber might be approximately in the range of 0.01% to 50% percent. Carbon nanotubes might have a diameter ranging from 2 nm to 50 nm and a length of 1 micron to 20 microns. For the reinforcement to be effective over the entire length of the glass fiber, it is important that the reinforcing nanofibers be oriented approximately along the length of the fiber and that their distribution be substantially uniform. Carbon nanotubes have electrical polarizabilities in the transverse direction to the fiber length, but the values in this direction are typically an order of magnitude or more smaller than the values along the fiber length.

Methods of drawing glass fiber from a preform are known. A known method of drawing fibers with nanofiber reinforcement is to disperse the nanofibers in a glass preform. The glass preform is then heated such that the glass viscosity becomes suitable for drawing into a fiber only at the very bottom of the preform. In drawing glass fiber, it is important that any trapped gas be removed from the preform during preform fabrication. This can be handled conveniently by degassing the melted glass in a vacuum chamber. However, when nanofibers are dispersed in the preform, the density of the nanofibers is generally different from that of the glass. In the time that it takes for the trapped air to degas, the nanofibers can either float to the top of the molten glass by buoyancy force or can sink to the bottom by the force of gravity.

Known methods exist for using electric fields to orient carbon nanotubes during their growing process. Carbon nanotubes are electrically polarizable, and polarized carbon nanotubes tend to line up in the direction of the electric field. Because of the small size of the carbon nanotubes, they can undergo substantial oscillation at temperature in gas, and electric fields of the order of one (1) Volt per micron are required for orientation. In known processes, nanotubes can exist in a molten glass with a substantial viscosity, compared to gas, that will tend to damp thermal vibrations. Thus, considerably less electric field strengths are expected to be useful for orienting the nanotubes in molten glass than are used in their growth process. In addition to using an electric field to orient the nanofibers, an electric field gradient can be used to apply a body force to the nanofibers to control the positioning of the nanofibers in a glass melt. There is a tendency of the nanofibers to form a network in the presence of the electric field, i.e., the positive charge of the end of one fiber will attach to the negative charged end of another fiber. Through this process, the homogeneous distribution of nanofibers throughout a glass preform will be assisted.

If an object is electrically polarized, a body force can be exerted on it by placing it in an electric field gradient. As an example, for a 2-nm diameter, 20 micron-long nanotube, the electrical polarization constant along the length of the fiber is $A=2e-23$ $Nm^3/V^2$. Assuming that the difference in density between the molten glass and the nanotube is 1000 $kg/m^3$, there will be a buoyancy force on the fiber of 6e-19 N. The force from the electric field gradient is $F=2$ $A$ $E$ $dE/dz$, where E is the electric field and $dE/dz$ is the field gradient. With an electric field of 1e4 V/m and a field gradient of 1 $V/m^2$, the electric force on the fiber is 4e-19 N. Thus, modest values of electric field and electric field gradient are sufficient to control the buoyancy force. The polarization varies according to the square of the fiber length and is proportional to the fiber radius. In this case, even fiber diameters of 100 nm can easily be accommodated by modest electric field and field gradient values. Further, this will have the effect that only fibers of a particular length will establish a force equilibrium. This tendency can be partially mitigated by allowing the field gradient to vary over the length of the melted glass. This can distribute fibers of different length along the length of the molten glass. In addition, fibers outside of a design range and extraneous debris can either float up or sink down in the glass melt. This contamination can be removed after the glass has cooled by removing a fraction of material from the preform at the top and bottom.

Accordingly, there is a need in the art for a device and method for glass preforms with nanofiber reinforcement that provide advantages over known devices and methods.

SUMMARY

This need for a device and method for glass preforms with nanofiber reinforcement is satisfied. Unlike known devices and methods, embodiments of the device and method may provide numerous advantages discussed below in the detailed description.

In an embodiment of the disclosure, there is provided an apparatus for making a glass preform with nanofiber reinforcement. The apparatus comprises a container for melting one or more glass components in a mixture comprising the glass components and one or more nanofibers. The apparatus further comprises an opening in the container that allows escape of any gas released from the glass components when the glass components are melted in the container. The apparatus further comprises one or more heating elements for heating the container. The apparatus further comprises one or more electric field devices, positioned exterior to the glass components, that create an electric field in a volume of the mixture in order to orient the nanofibers within the glass components when the glass components are melted in the container.

In another embodiment of the disclosure, there is provided an apparatus for making a glass preform with carbon nanofiber reinforcement. The apparatus comprises a refractory container for melting one or more glass components in a mixture comprising the glass components and one or more carbon nanofibers. The apparatus further comprises an opening in the container that allows escape of any gas released from the glass components when the glass components are melted in the refractory container. The apparatus further comprises one or more heating elements for heating the refractory container. The apparatus further comprises one or more pieces of insulation surrounding one or more exterior portions of the heating elements and one or more exterior portions of the refractory container. The apparatus further comprises one or more primary electrodes, positioned exterior to the glass components, that create an electric field in a volume of the mixture in order to orient the carbon nanofibers within the glass components when the glass components are melted in the refractory container. The apparatus further comprises one or more secondary electrodes, positioned exterior to the glass components, that apply a body force to the carbon nanofibers to control the position of the carbon nanofibers within the glass components when the glass components are melted in the refractory container. The apparatus further comprises a vacuum chamber for housing the refractory container, the heating elements, the primary electrodes, and the secondary electrodes. The vacuum chamber has a vacuum pump to pump the gas released from the glass components outside the vacuum chamber.

In another embodiment of the disclosure, there is provided a method of making a glass preform with nanofiber reinforcement. The method comprises providing a mixture of one or more glass components and one or more nanofibers in a container. The method further comprises positioning one or more electric field devices exterior to the glass components in the mixture. The method further comprises creating with the electric field devices an electric field in a volume of the mixture in order to orient the nanofibers along the electric field. The method further comprises heating the container with one or more heating elements to an effective temperature and for an effective period of time in order to melt the glass components in the mixture to form a melted mixture with nanofibers and melted glass components. The method further comprises degassing the melted mixture. The method further comprises cooling the melted mixture in order to secure the nanofibers in place within the melted mixture to form a solidified glass preform with nanofiber reinforcement. In an alternate embodiment of the method, degassing is performed prior to heating the container. There is also provided a glass preform with nanofiber reinforcement made by the above described method.

In another embodiment of the disclosure, there is provided a method of making a glass preform with carbon nanofiber reinforcement. The method comprises providing a mixture of one or more glass components and one or more carbon nanofibers in a refractory container. The method further comprises positioning one or more primary electrodes exterior to the glass components in the mixture. The method further comprises positioning one or more secondary electrodes exterior to the glass components. The method further comprises placing the refractory container in a vacuum chamber and drawing a vacuum in the vacuum chamber. The method further comprises creating with the primary electrodes an electric field in a volume of the mixture in order to orient the carbon nanofibers along the electric field. The method further comprises applying with the secondary electrodes a body force to the carbon nanofibers in order to position the carbon nanofibers. The method further comprises energizing one or more heating elements in order to heat the refractory container to an effective temperature to melt the glass components in the mixture and to form a melted mixture with nanofibers and melted glass components. The method further comprises degassing the melted mixture. The method further comprises de-energizing the one or more heating elements after an effective period of time. The method further comprises cooling the melted mixture in order to secure the carbon nanofibers in place within the melted mixture to form a solidified glass preform with carbon nanofiber reinforcement. The method further comprises removing the glass preform with carbon nanofiber reinforcement from the vacuum chamber for further processing in a fiber drawing apparatus. In an alternate embodiment of the method, degassing is performed prior to energizing the one or more heating elements in order to heat the refractory container. There is also provided a glass preform with nanofiber reinforcement made by the above described method.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1A:
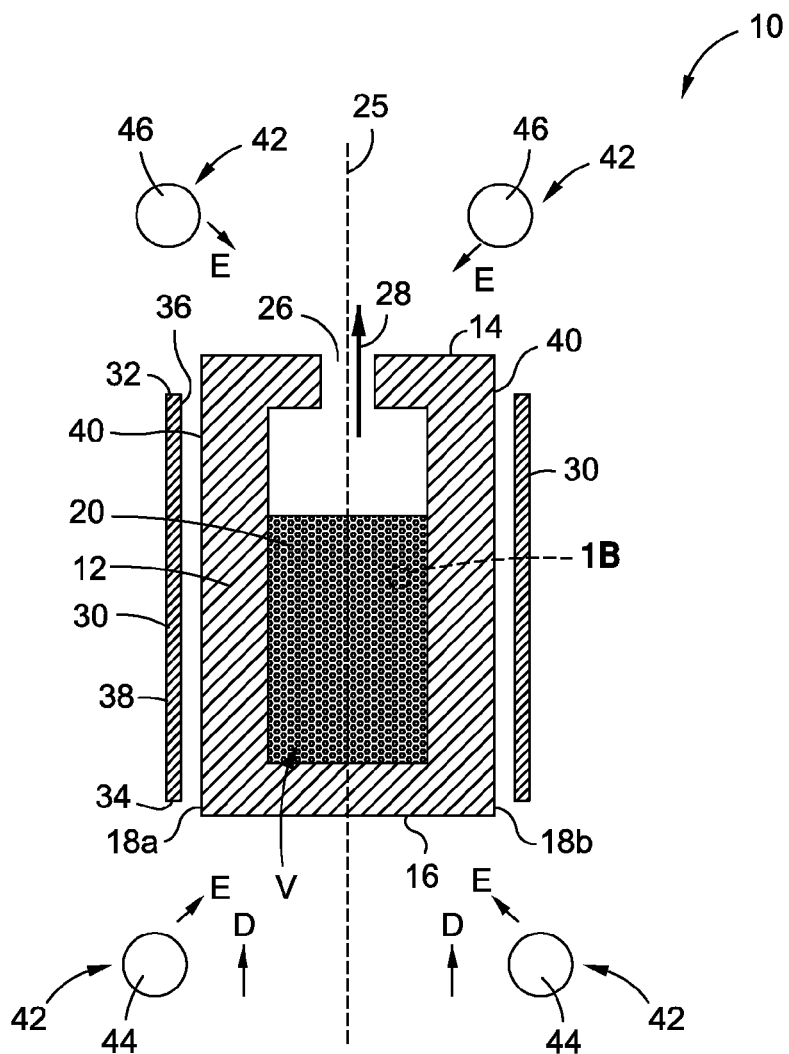
FIG. 1A is an illustration of a schematic diagram of one of the embodiments of an apparatus used to make the glass preform with nanofiber reinforcement of the disclosure.
Figure 1B:
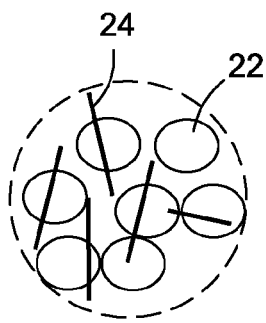
FIG. 1B is an illustration of a close-up view of a portion of the mixture of FIG. 1A showing the glass components and nanofibers.

Referring now to the Figures, FIG. 1A is an illustration of a schematic diagram of one of the embodiments of an apparatus 10 used to make a glass preform 150 (see FIG. 7) with nanofiber 24 reinforcement. The apparatus 10 comprises a container 12. The container 12 has a first end 14 and an opposite second end 16. The container 12 further has sides 18a, 18b. Preferably, the container 12 is a refractory container that retains its strength and stability at high temperatures, such as above 1000° F. (degrees Fahrenheit). The container 12 is used to hold a mixture 20. The mixture 20 is preferably comprised of one or more glass components 22 (see FIG. 1B) and one or more nanofibers 24 (see FIG. 1B). FIG. 1B is an illustration of a close-up view of a portion of the mixture 20 of FIG. 1A showing the glass components 22 and nanofibers 24. The glass components 22 may comprise any suitable glass material that does not chemically interact with the nanofiber. Preferably, the glass components 22 comprise E-glass, S-glass, pure silica, borosilicate glass, optical glass, and other suitable glass materials. Preferably, the glass components 22 are in the form of glass powder, glass chips, or glass chunks. In an alternate embodiment of the mixture, instead of glass components, the mixture 20 may comprise a suitable polymeric material, such as an organic polymer, or another suitable material capable of being made into a fiber. Preferably, the nanofibers 24 comprise carbon nanofibers, nanotubes such as single wall nanotubes, multiwall nanotubes, and carbon nanotubes, and nanofibers and nanotubes comprised of boron, nitride, silicon carbide, or another suitable material that is capable of electrical polarization. In an alternate embodiment of the mixture, instead of nanofibers, the mixture 20 may comprise micron-sized fibers. The container 12 is used to melt the one or more glass components 22 of the mixture 20. Preferably, the container 12 is constructed of a material that does not react with the glass components 22 when the glass components 22 are melted in the container 12. The container 12 may preferably be made of a suitable refractory material such as zircon, dense chrome oxide, or another suitable refractory material. FIG. 1A also shows a centerline 25 through the center of the container 12.

The apparatus 10 further comprises an opening 26 in the container 12 that allows escape of any gas 28 released from the glass components 22 when the glass components 22 are melted in the container 12. The apparatus 10 further comprises one or more heating elements 30 for heating the container 12 in order to melt the glass components 22 in the mixture 20. In one embodiment, the one or more heating elements 30 may comprise a high-temperature heating device made of a material such as molybdenum disilicide, tungsten, molybdenum, silicon carbide, nichrome, or another suitable high-temperature heating material. As shown in FIG. 1A, each heating element 30 has a first end 32, a second end 34, an inner side 36, and an outer side 38. The inner side 36 of each heating element 30 is preferably in close proximity to one or more exterior portions 40 of the container 12. As shown in FIG. 1A, the inner side 36 of each heating element 30 is preferably in close proximity to exterior portions 40 of sides 18a, 18b, respectively, of the container 12. The heating elements 30 may be powered with an electric power source (not shown) such as electrical wires, plugs, and connectors, or may be powered with another suitable power source.

Figure 6A:
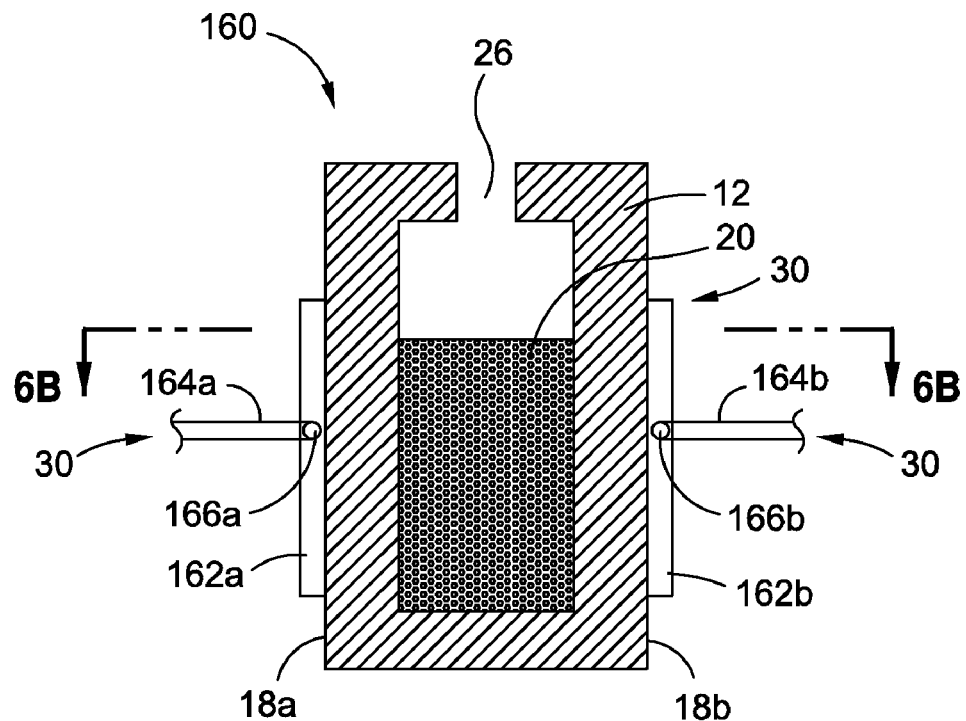
FIG. 6A is an illustration of a schematic diagram of yet another embodiment of an apparatus used to make the glass perform with nanofiber reinforcement of the disclosure.
Figure 6B:
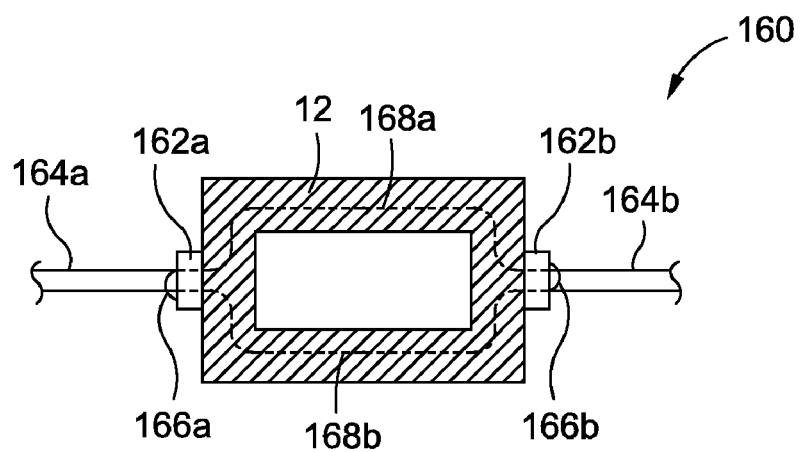
FIG. 6B is an illustration of a cross-section of the apparatus of FIG. 6A taken along lines 6B-6B.

In another embodiment, the one or more heating elements 30 may comprise an electrical source, such as a wire, that generates current such as a direct current (dc) passing through the container, an alternating current (ac) passing through the container, or a combination of a direct current (dc) and an alternating current (ac) passing through the container. FIG. 6A is an illustration of a schematic diagram of another embodiment of an apparatus 160 used to make the glass perform 150 (FIG. 7) with nanofiber reinforcement of the disclosure. FIG. 6B is an illustration of a cross-section of the apparatus 160 of FIG. 6A taken along lines 6B-6B. The apparatus 160 comprises a container 12 with another embodiment of the heating elements 30. The container 12 has tab portions 162a, 162b attached or coupled to sides 18a, 18b, respectively. The tab portions 162a, 162b each have an attachment element 166a, 166b, respectively, for attachment to electrical wires 164a, 164b, respectively. The attachment elements 166a, 166b may comprise bolts, welding elements, or other suitable attachment means. As shown in FIG. 6A, the electrical wires 164a, 164b are attached at one end to the tab portions 162a, 162b, respectively, with attachment elements 166a, 166b in the form of bolts. The electrical wires 164a, 164b at an opposite end are preferably each attached to an electrical source (not shown) that provides electrical current to the electrical wires 164a, 164b. The heating elements 30 in this embodiment are in the form of an electrical source, such as a wire, that generates current such as direct current (dc), alternating current (ac), or a combination of direct current (dc) and alternating current (ac), that spreads along the tabs 162a, 162b, and along the walls of the container 12 to heat the container 12. As shown in FIG. 6B, electrical current paths 168a, 168b flow between the electrical wires 164a, 164b, on both sides of the container 12 and through the container 12 walls. The mixture 20 may then be heated via the electrical current paths 168a, 168b that flow between the electrical wires 164a, 164b. The electrical current paths 168a, 168b, preferably enter one side 18a of the container 12 through electrical wire 164a and exit the opposite side 18b of the container 12 through electrical wire 164b. The Joule heating created by passing the direct current, the alternating current, or a combination of the direct current and alternating current through the resistance of the container 12 may form the one or more heating elements 30 to supply the required heat to heat the mixture 20.

The apparatus 10 further comprises one or more electric field devices 42. Preferably, the one or more electric field devices 42 comprise electrically conductive primary electrodes 44, 46 having different electrical voltages. As shown in FIG. 1A, the electric field devices 42 comprise lower voltage primary electrodes 44 and upper voltage primary electrodes 46. The electric field devices 42 are positioned exterior to the glass components 22 and create an electric field (E) in a volume (V) of the mixture in order to orient the nanofibers 24 within the glass components 22 along electric field lines when the glass components 22 are melted in the container 12. By establishing the lower voltage primary electrodes 44 and the upper voltage primary electrodes 46 at different electrical voltages, an electric field (E) is established in a substantially vertical direction (D) through container 12 and the mixture 20. By controlling the shape of the primary electrodes 44, 46, a mostly uniform electric field (E) can be established. Primary electrodes 44, 46 may also be configured to supply a field gradient in addition to the constant field. The primary electrodes 44, 46, may be made of copper, aluminum, or another suitable material having good electrical conductivity.

Figure 2A:
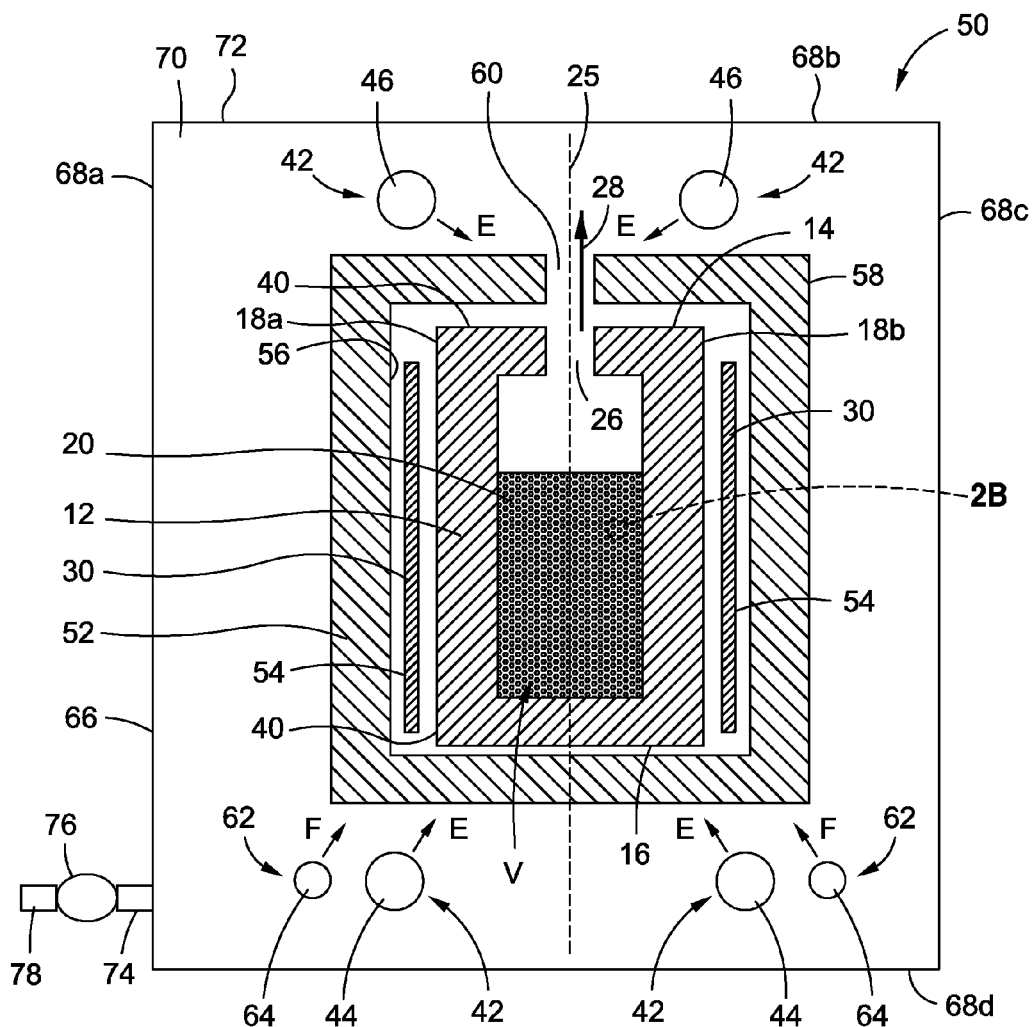
FIG. 2A is an illustration of a schematic diagram of another embodiment of an apparatus used to make the glass preform with nanofiber reinforcement of the disclosure.
Figure 2B:
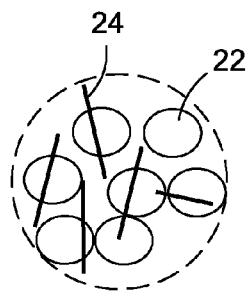
FIG. 2B is an illustration of a close-up view of a portion of the mixture of FIG. 2A showing the glass components and nanofibers.

FIG. 2A is an illustration of a schematic diagram of another embodiment of an apparatus 50 used to make the glass preform 150 (see FIG. 7) with nanofiber 24 reinforcement of the disclosure. The apparatus 50 has the same features as the apparatus 10 of FIG. 1A, and has additional features as well. The apparatus 50 comprises container 12. The container 12 has first end 14 and an opposite second end 16. The container 12 further has sides 18a, 18b. Preferably, the container 12 is a refractory container. The container 12 is used to hold the mixture 20 preferably comprised of one or more glass components 22 (see FIG. 2B) and one or more nanofibers 24 (see FIG. 2B). FIG. 2B is an illustration of a close-up view of a portion of the mixture 20 of FIG. 2A showing the glass components 22 and nanofibers 24. The glass components 22 and nanofibers 24 that may be used are discussed above. The apparatus 10 further comprises opening 26 in the container 12 that allows escape of any gas 28 released from the glass components 22 when the glass components 22 are melted in the container 12. The apparatus 50 further comprises one or more heating elements 30 for heating the container 12 in order to melt the glass components 22. The heating elements 30, as discussed above, may in one embodiment comprise a high-temperature heating device made of a material such as molybdenum disilicide, tungsten, molybdenum, silicon carbide, nichrome, or another suitable high-temperature heating material. Preferably, such heating elements 30, as shown in FIG. 2A, are in close proximity to one or more exterior portions 40 of the container 12. In this embodiment of the apparatus 50, the apparatus 50 further comprises one or more pieces of insulation 52 surrounding one or more exterior portions 54 of the heating elements 30 and surrounding one or more exterior portions 40 of the container 12. The insulation 52 is preferably high-temperature thermal insulation comprising, for example, mullite, fiberglass, foam, or another suitable high-temperature thermal insulation. The insulation 52 has an inner surface 56, an outer surface 58, and an opening 60 that lets gas 28 escape from the glass components 22 to be melted in the container 12. The heating elements 30, as discussed above and shown in FIGS. 6A and 6B, may in another embodiment comprise and an electrical source, such as a wire, that generates current such as a direct current (dc) passing through the container, an alternating current (ac) passing through the container, or a combination of a direct current (dc) and an alternating current (ac) passing through the container. The Joule heating created by passing the direct current, the alternating current, or a combination of the direct current and alternating current through the resistance of the container 12 may form the one or more heating elements 30 to supply the required heat to heat the mixture 20.

The apparatus 50 further comprises one or more electric field devices 42. Preferably, the one or more electric field devices 42 comprise electrically conductive primary electrodes 44, 46, having different electrical voltages. As shown in FIG. 2A, the electric field devices 42 comprise lower voltage primary electrodes 44 and upper voltage primary electrodes 46. The electric field devices 42 are positioned exterior to the glass components 22 and exterior to the insulation 52 and create an electric field (E) in a volume (V) of the mixture in order to orient the nanofibers 24 within the glass components 22 along electric field lines when the glass components 22 are melted in the container 12.

In this embodiment, the apparatus 50 further comprises one or more electric field gradient devices 62 positioned exterior to the glass components 22 and exterior to the insulation 52. The electric field gradient devices 62 apply a body force (F) to the nanofibers 24 to control the position of the nanofibers 24 within the glass components 22 when the glass components 22 are melted in the container 12. Preferably, the electric field gradient devices 62 comprise secondary electrodes 64 that may be added either above or below the container 12 to help establish and control the electric field gradient. The secondary electrodes 64 provide the option of modifying the electric field (E) and electric field gradient (F) independently of each other during the melting process. The secondary electrodes 64 may be made of copper, aluminum, or another suitable material having good electrical conductivity.

In this embodiment, the apparatus 50 further comprises a vacuum chamber 66 for housing the refractory container 12, the heating elements 30, the primary electrodes 44, 46, and the secondary electrodes 64. The vacuum chamber 66 has walls 68a, 68b, 68c, 68d. The vacuum chamber 66 further has interior portion 70 and exterior portion 72. The vacuum chamber 66 preferably has an opening port 74 connected to or through wall 68a of the vacuum chamber 66. The opening port 74 connects the vacuum chamber 66 to a vacuum pump 76. The vacuum pump 76 is, in turn, connected to an exit port 78. The vacuum pump 76 pumps or exhausts the gas 28 released from the glass components 22 to outside the vacuum chamber 66, such as to ambient air. The vacuum pump 76 may be powered by a power source (not shown), such as an electrical power source or another suitable power source.

Figure 3:
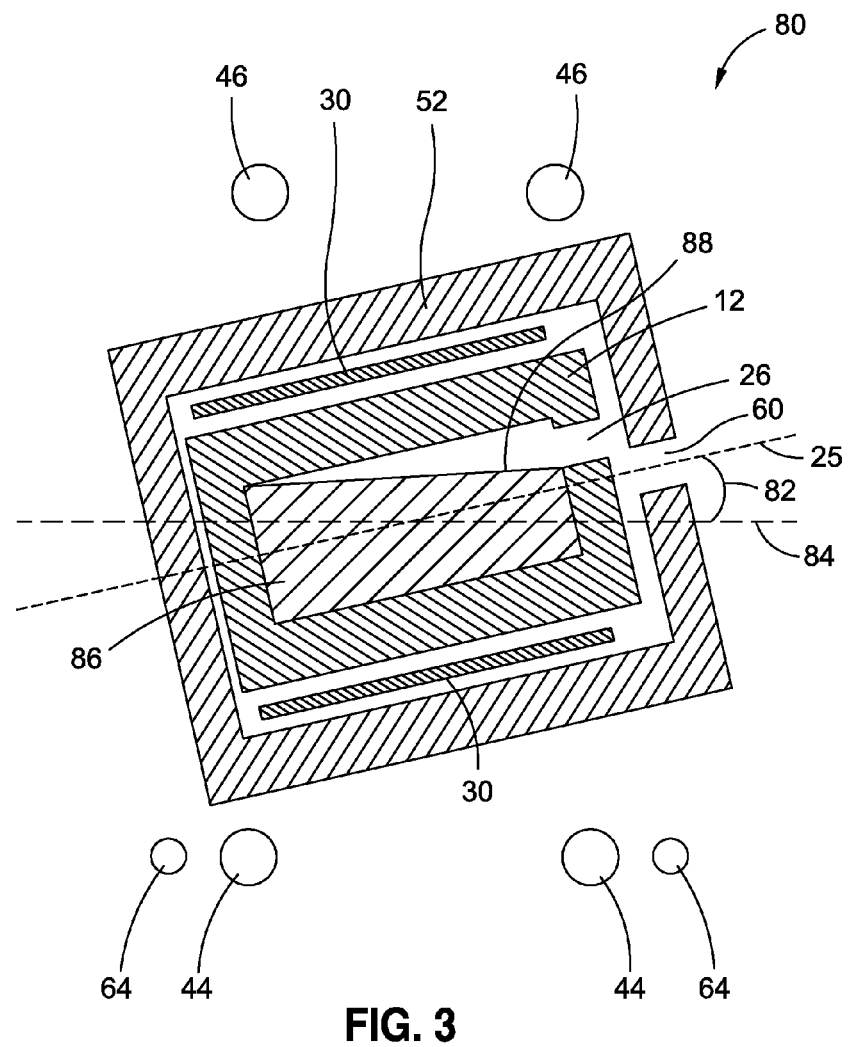
FIG. 3 is an illustration of a schematic diagram of yet another embodiment of an apparatus used to make the glass preform with nanofiber reinforcement of the disclosure.

FIG. 3 is an illustration of a schematic diagram of yet another embodiment of an apparatus 80 used to make the glass preform 150 (see FIG. 7) with nanofiber 24 reinforcement of the disclosure. The container 12 has centerline 25 that is tilted at an angle 82 in a range of from about 1 degree to about 20 degrees relative to a horizontal axis 84 of the apparatus 80 prior to the glass components 22 being melted in the container 12. A melted mixture 86 of nanofibers 24 and melted glass components 22 has a free surface 88 that is tilted relative to the centerline 25 of the container 12, and the final cooled shape of the resulting preform may not be symmetric. However, the shape of the resulting preform does not need to be too well defined to draw a good fiber. The opening 26 in the container 12 is no longer centered and need not be concentric with the opening 60 of the insulation 52. The smaller vertical height of the geometry of apparatus 80 allows more flexibility in fixing the electric field gradient. Preferably, the orientation of the nanofiber 24 is substantially vertical in this embodiment. When the preform is placed in a fiber drawing apparatus (not shown), the nanofibers 24 start with an orientation that has a significant angle from the longitudinal axis of the nanofiber 24 to be pulled. However, as the nanofiber is pulled, the geometry of the melted glass components 22 in the preform substantially elongates and the nanofiber 24 follows this elongation and changes its orientation to be substantially vertical, i.e., oriented along the nanofiber axis.

Figure 4:
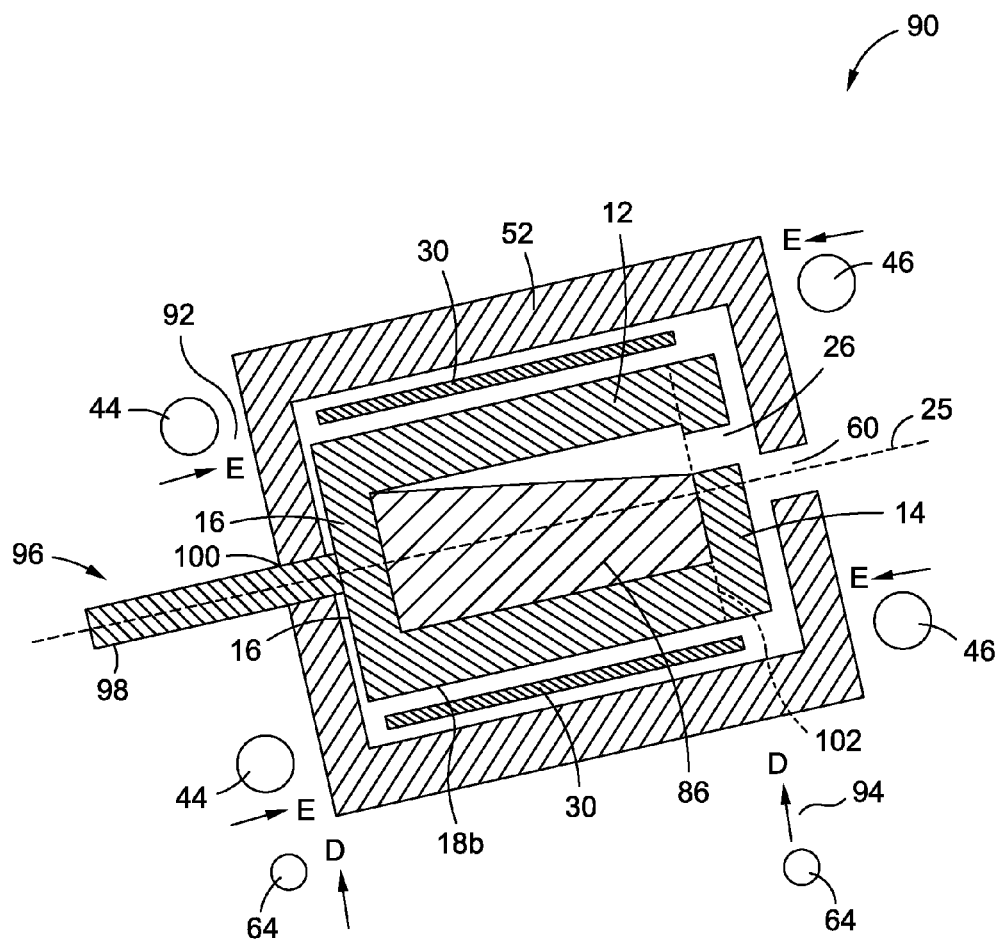
FIG. 4 is an illustration of a schematic diagram of yet another embodiment of an apparatus used to make the glass preform with nanofiber reinforcement of the disclosure.

FIG. 4 is an illustration of a schematic diagram of yet another embodiment of an apparatus 90 used to make the glass preform 150 (FIG. 7) with nanofiber 24 reinforcement of the disclosure. In this embodiment of the apparatus 90, the container 12, heating elements 30, and insulation 52 are again tilted as with the apparatus 80 in FIG. 3. The orienting field primary electrodes 44, 46 have been moved to provide a uniform electric field (E) 92 along the centerline 25 of the container 12, so that the nanofibers 24 are oriented substantially along this centerline 25. The gradient field secondary electrodes 64 are located to provide a force on the nanofibers 24 in a vertical direction (D) 94. In general, the voltage on the electrodes will be constant or slowly varying direct current (dc). However, the voltage could be a combination of direct current (dc) with a small alternating current (ac) component. Or the voltages could be purely alternating current (ac), with the frequency and phases of the electric field primary electrodes 44, 46, and the field gradient secondary electrodes 64 synchronized to give predominantly a constant force and a small alternating force. The latter is designed to vibrate the nanofibers 24 a small amount so that they will find their equilibrium position sooner. Referring again to FIG. 4, the container 12 can be made to rotate about its centerline 25 to further influence the distribution of the nanofibers 24. In the embodiment shown in FIG. 4, the first end 14 of the container is preferably stationary, while the second end 16 of the container 12 and side 18b of the container rotate. The apparatus 90 may further comprise a rotation mechanism 96 for rotating the container 12 about its centerline 25. Preferably, the rotation mechanism 96 comprises a mechanical shaft 98 that connects to the second end 16 of the container 12 through a penetration opening 100 in the insulation 52. The mechanical shaft 98 can be rotated via a power source such as a motor (not shown), can be rotated manually, or can be rotated with another suitable power source. As shown in FIG. 4, the opening 26 in the container 12 is not concentric with the opening 60 of the insulation 52 and the centerline 25 of the container 12. In an alternate embodiment, the opening 26 in the container 12 and the opening 60 of the insulation 52 may be concentric with the centerline 25 of the container 12 and keep the melted mixture 86 below a bottom edge 102 of the opening 26 of the container 12. In this geometry, the first end 14 of the container 12 can rotate together with the second end 16 of the container 12 and the mechanical shaft 98.

Figure 5A:
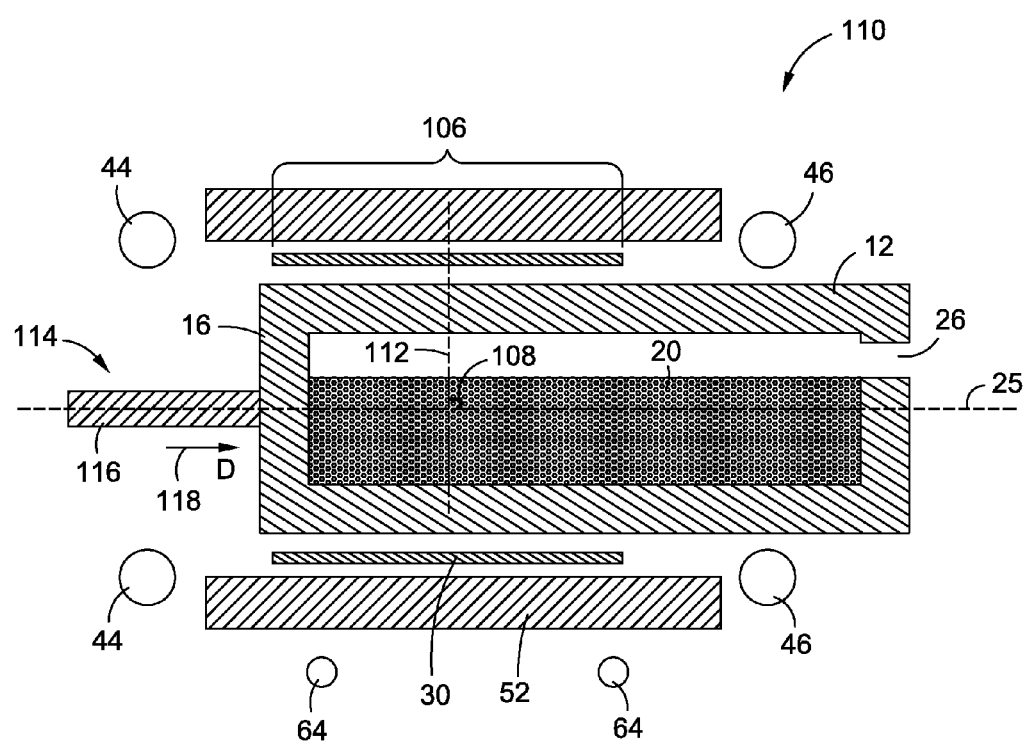
FIG. 5A is an illustration of a schematic diagram of yet another embodiment of an apparatus used to make the glass preform with nanofiber reinforcement of the disclosure.
Figure 5B:
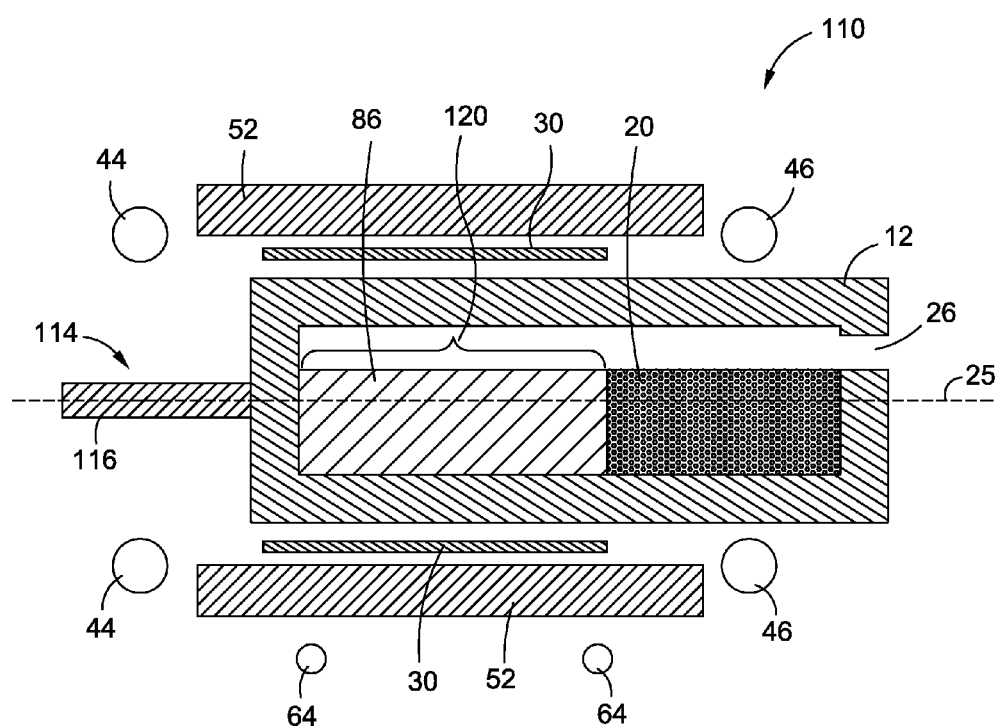
FIG. 5B is an illustration of the apparatus of FIG. 5A showing formation of a melted mixture.
Figure 5C:
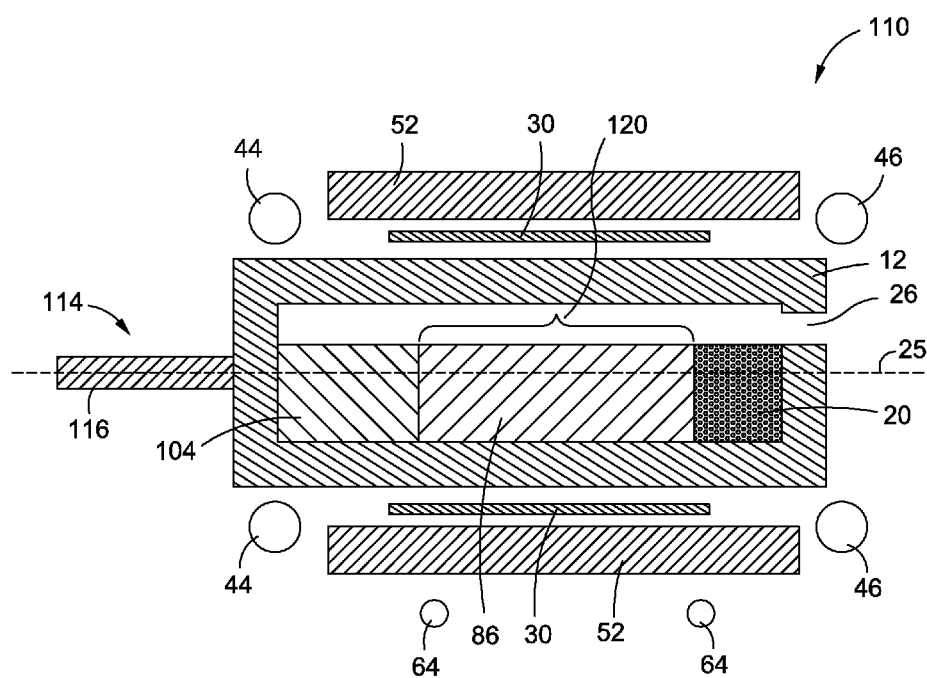
FIG. 5C is an illustration of the apparatus of FIG. 5A showing formation of a solidified mixture with solidified glass components and oriented nanofibers.

FIG. 5A is an illustration of a schematic diagram of yet another embodiment of an apparatus 110 used to make the glass preform 150 (FIG. 7) with nanofiber 24 reinforcement of the disclosure. FIG. 5B is an illustration of the apparatus 110 of FIG. 5A showing formation of the melted mixture 86. FIG. 5C is an illustration of the apparatus 110 of FIG. 5A showing formation of a solidified mixture 104 with solidified glass components 22 and oriented nanofibers 24. The apparatus 110 comprises a container 12 that is longer than a length 106 of each heating element 30 and has a centerline 25 that is tilted at a 90 degree angle 108 relative to a vertical axis 112 of the apparatus 110 prior to the glass components 22 being melted in the container 12. The apparatus 110 further comprises a moving device 114, preferably comprising a rod 116, to move the container 12 in a horizontal direction (D) 118. Initially, the container 12 is filled with a mixture 20 of glass components 22, preferably glass powder, and nanofibers 24, preferably carbon nanofibers. The heating elements 30 are then turned on to their operating temperatures. As shown in FIG. 5B, the mixture 20 within a zone 120 of the heating elements 30 has melted to form a melted mixture 86 of nanofibers 24, preferably carbon nanofibers, and melted glass components 22, preferably melted glass powder. The mixture 20 to the right of the heating elements 30 remains unmelted. The container 12 and its contents of the mixture 20 and the melted mixture 86 are then moved slowly to the left by means of the rod 116. Alternatively, the rest of the apparatus 110 shown in FIG. 5B can be moved to the right with the container 12, the mixture 20, and the melted mixture 86 remaining stationary. The result is that shown in FIG. 5C, in which the solidified mixture 104 that has moved left of the zone 120 of the heating elements 30 has turned into solidified glass and oriented carbon nanofiber. Eventually (not shown), when the container 12 has moved sufficiently to the left, all of the mixture 20 becomes the melted mixture 86. At this point, the heating elements 30 can be turned off and the melted mixture 86 will cool to form the solidified mixture 104. The advantage of this embodiment is that the distance between the primary electrodes 44, 46, can be kept relatively short, ensuring a sufficient electric field to align and levitate the nanofibers, while the length of the preform can be made arbitrarily long. The embodiment of the apparatus 110 shown in FIGS. 5A-5C can be considered an analog of a zone melting technique.

Figure 7:
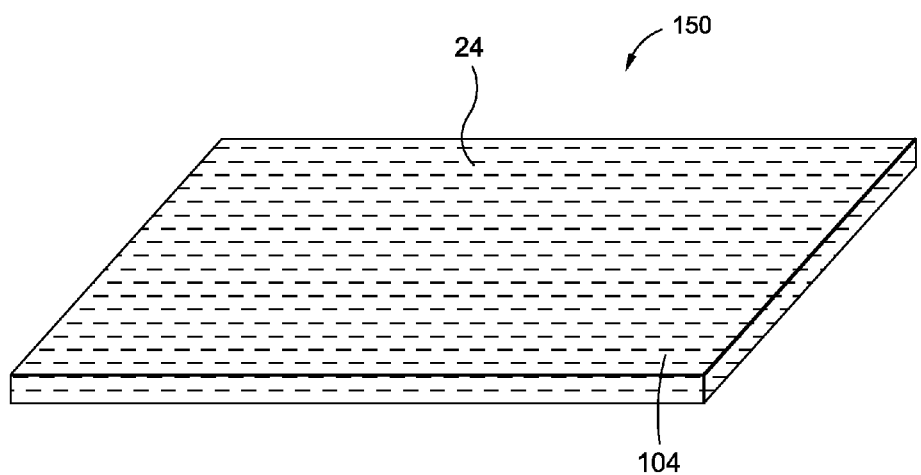
FIG. 7 is an illustration of one of the embodiments of a preform made with the apparatus and method of the disclosure.

FIG. 7 is an illustration of one of the embodiments of the glass preform 150 made with embodiments of the apparatus and method of the disclosure. The glass preform 150 comprises the solidified mixture 104 of solid glass with nanofiber 24 reinforcement. The glass preform 150 made with embodiments of the apparatus and method of the disclosure has oriented and well dispersed nanofibers, preferably carbon nanofibers, throughout the glass preform 150 that are dispersed in a regular and oriented fashion. The glass preform 150 is capable of being drawn into a continuous glass fiber with nanofiber reinforcement. In addition to the rectangular parallelpiped shape of the glass perform 150 shown in FIG. 7, the glass preform may be a rectangular parallelpiped shape with round edges, may be an oval shape, may be a cylindrical shape, or may be another suitable shape. The glass perform 150 preferably has glass fibers each having a diameter in a range of from about 10 microns to about 20 microns, and each having a length of about 5 cm (centimeters) or greater. The glass perform 150 may preferably have carbon nanotubes each having a diameter in a range of from about 2 nm (nanometers) to about 50 nm, and each having a length in a range of from about 1 micron to about 20 microns. The glass perform 150 may preferably have carbon nanofibers each having a diameter in a range of from about 2 nm to about 200 nm, and each having a length in a range of from about 1 micron to about 20 microns.

Figure 8:
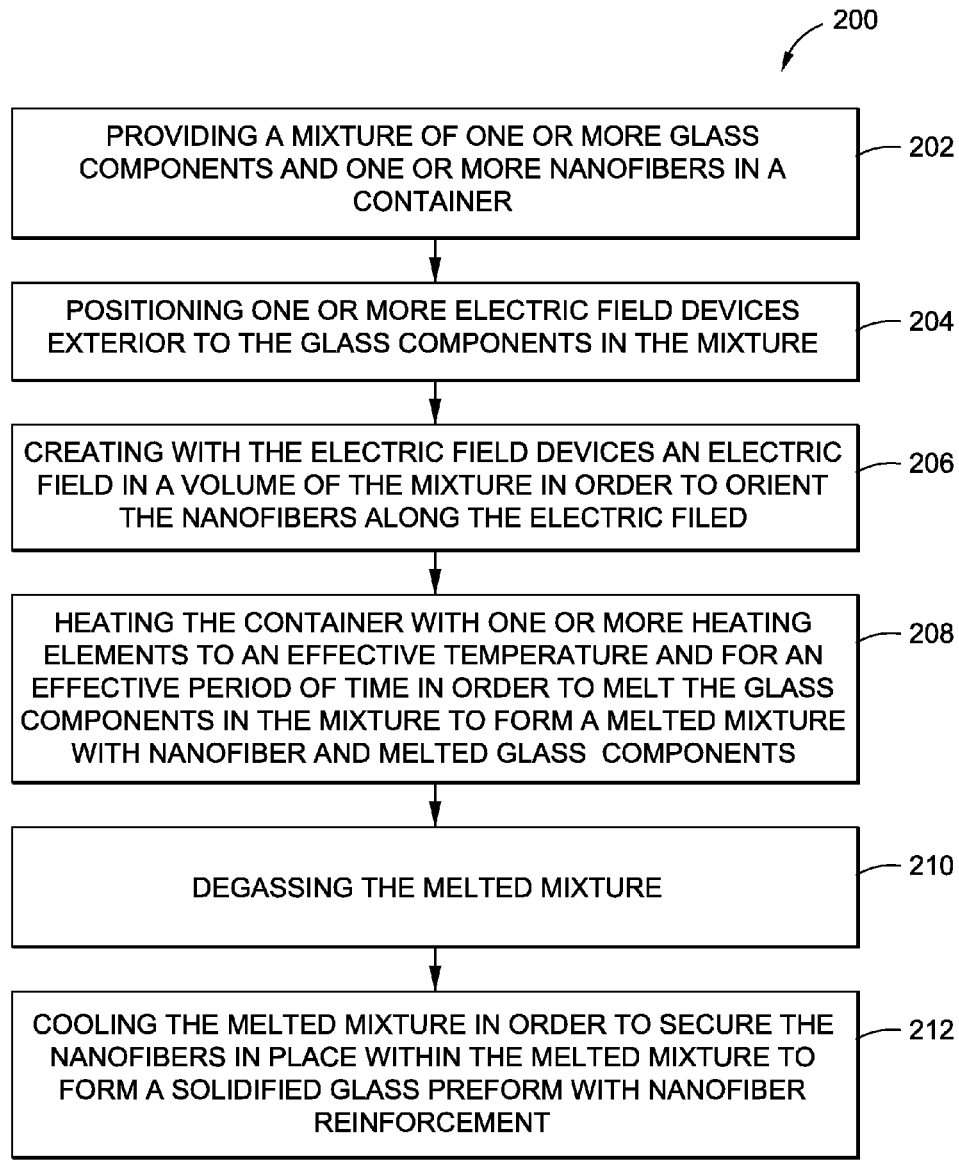
FIG. 8 is an illustration of a flow diagram of an embodiment of a method of the disclosure for making one of the embodiments of the preform with nanofiber reinforcement of the disclosure.

FIG. 8 is an illustration of a flow diagram of an embodiment of a method 200 of the disclosure for making one of the embodiments of the glass preform 150 (see FIG. 7) with nanofiber 24 reinforcement of the disclosure. The method 200 comprises step 202 of providing a mixture 20 of one or more glass components 22 (see FIG. 1B) and one or more nanofibers 24 (see FIG. 1B) in a container 12, preferably a refractory container. The glass components 22 and the nanofibers 24 may be uniformly mixed ahead of time before placing them in the container 12, and such premixing step is optional. Preferably, the glass components 22 comprise glass powder and the nanofibers 24 comprise carbon nanofibers. Preferably, the glass components 22 and the nanofibers 24 are chemically compatible. The method 200 further comprises step 204 of positioning one or more electric field devices 42, preferably in the form of primary electrodes 44, 46, (see FIG. 1A) exterior to the glass components 22 in the mixture 20. Optionally, after positioning the one or more electric field devices 42 exterior to the glass components 22 in the mixture, the method 200 may comprise positioning one or more electric field gradient devices 62 exterior to the glass components 22. Optionally, after mixing the glass components 22 and the nanofibers 24 in the container 12, after positioning the one or more electric field devices 42, and after positioning the one or more electric field gradient devices 62 exterior to the glass components 22, the method 200 may comprise placing the container 12 in a vacuum chamber 66 and drawing a vacuum in the vacuum chamber 66. The method 200 further comprises step 206 of creating with the electric field devices 42 an electric field (E) in a volume (V) (see FIG. 1A) of the mixture 20 in order to orient the nanofibers 24 along lines of the electric field (E). Optionally, the method 200 may further comprise, if one or more electric field gradient devices 62 are positioned, applying with the electric field gradient devices 62 a body force to the nanofibers. The method 200 further comprises step 208 of heating the container 12 with one or more heating elements 30 (see FIG. 1A) to an effective temperature and for an effective period of time in order to melt the glass components 22 in the mixture 20 to form a melted mixture 86 (see FIG. 5B) with nanofibers 24 and melted glass components 22. The glass melting temperature is below the temperature at which the nanofibers decompose. Preferably, the effective temperature for heating the mixture is in a range of from about 800 degrees Celsius to about 2000 degrees Celsius. Preferably, the effective period of time to melt the glass components 22 in the mixture 20 is in a range of from about ten (10) minutes to about five (5) hours. The heating elements 30, as discussed above, may in one embodiment comprise a high-temperature heating device made of a material such as molybdenum disilicide, tungsten, molybdenum, silicon carbide, nichrome, or another suitable high-temperature heating material. Preferably, such heating elements 30 are in close proximity to one or more exterior portions 40 of the container 12. The heating elements 30, as discussed above and shown in FIGS. 6A and 6B, may in another embodiment comprise an electrical source, such as a wire, that generates current such as a direct current (dc) passing through the container, an alternating current (ac) passing through the container, or a combination of a direct current (dc) and an alternating current (ac) passing through the container. The Joule heating created by passing the direct current, the alternating current, or a combination of the direct current and alternating current through the resistance of the container 12 may form the one or more heating elements 30 to supply the required heat to heat the mixture 20. After heating the container, the container 12 may be tilted so that a centerline 25 of the container 12 is at an angle in a range of from about 1 degree to about 20 degrees relative to a vertical axis of the container, and then the container 12 may be rotated about its centerline. Alternately, the container 12 may be a tilted container that is already tilted prior to heating so that a centerline of the container is at an angle in a range of from about 1 degree to about 20 degrees relative to a vertical axis of the container. In another embodiment, after heating the container, the container may be tilted so that a centerline of the container is at a 90 degree angle relative to a vertical axis of the container. Alternately, the container may be a tilted container that is already tilted prior to heating, so that a centerline of the container is at a 90 degree angle relative to a vertical axis of the container.

The method 200 further comprises step 210 of degassing the melted mixture 86. Degassing is needed to prevent or minimize the formation of air bubbles in the glass preform, as the presence of air bubbles can create flaws in the fiber drawn from the glass preform. Any trapped gas 28 or air in the glass components 22 or glass powder can escape through the opening 26 in the container 12. While the glass components 22 melt, all or most all of the trapped gas 28 or air eventually escapes from the apparatus 10, and the nanofibers 24 will orient themselves and find their equilibrium positions where the buoyancy force is balanced by the force of the electric field gradient. After sufficient time for both degassing and nanofiber positioning to take place, the heating elements 30 are turned off or deenergized and the melted mixture 86 is allowed to cool in a controlled manner, locking the nanofibers in place. The method 200 further comprises step 212 of cooling the melted mixture 86 in order to secure the nanofibers 24 in place within the melted mixture 86 to form a solidified mixture 104 (see FIG. 5C) and a solidified glass preform 150 (see FIG. 7) with nanofiber 24 reinforcement. The preform 150 (see FIG. 7) that is formed may then be taken to a fiber drawing apparatus (not shown). There is also provided a glass perform, such as glass perform 150, with nanofiber reinforcement made by the steps of the method 200 described above.

Figure 9:
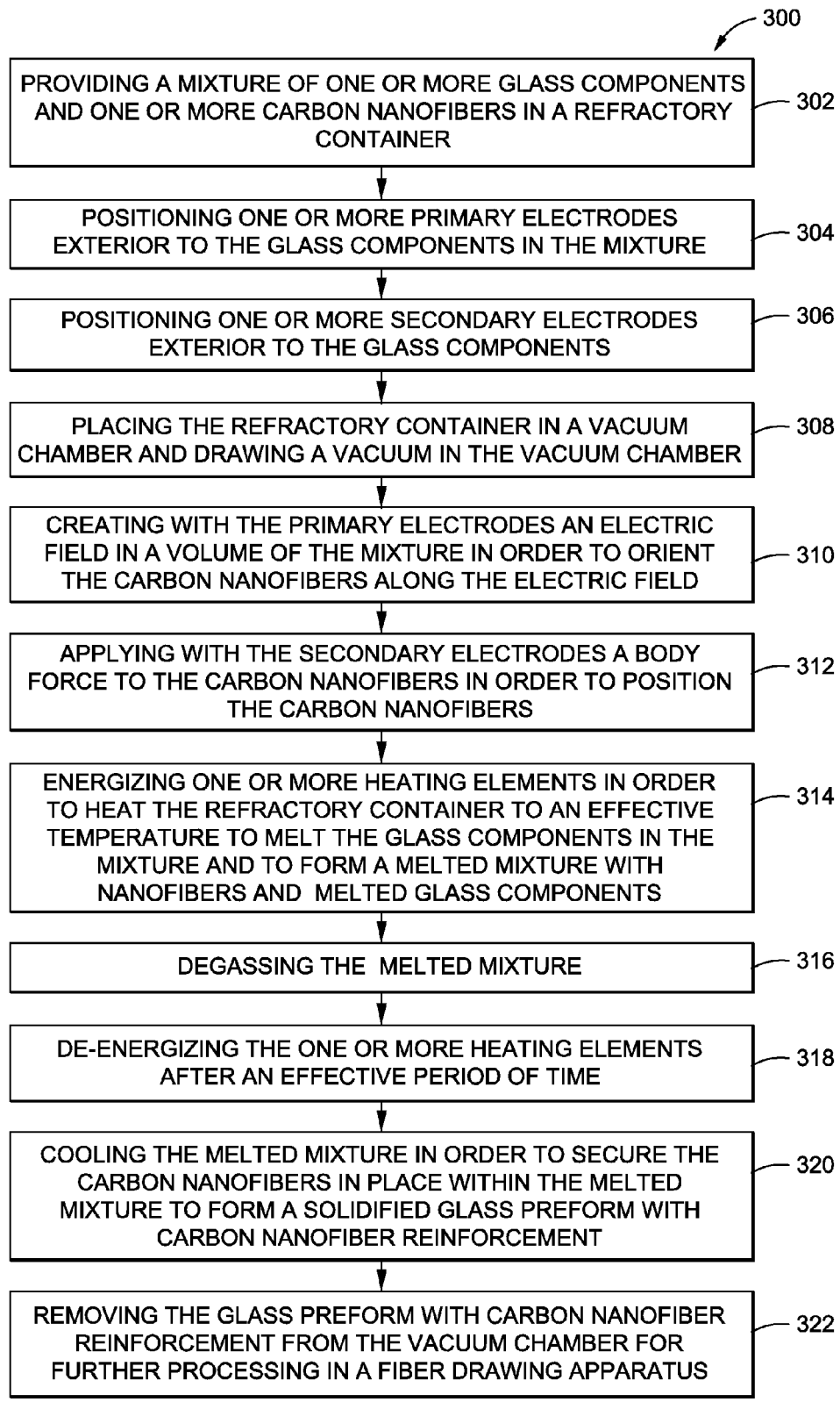
FIG. 9 is an illustration of a flow diagram of another embodiment of a method of the disclosure for making one of the embodiments of the preform with nanofiber reinforcement of the disclosure; and, FIG. 10 is an illustration of a flow diagram of yet another embodiment of a method of the disclosure for making one of the embodiments of the preform with nanofiber reinforcement of the disclosure.

FIG. 9 is an illustration of a flow diagram of another embodiment of a method 300 of the disclosure for making one of the embodiments of the glass preform 150 (see FIG. 7) with nanofiber 24 reinforcement of the disclosure. The method 300 comprises step 302 of providing a mixture 20 (see FIG. 2A) of one or more glass components 22 and one or more nanofibers 24 in a container 12, preferably a refractory container. The glass components 22 and the nanofibers 24 may be uniformly mixed ahead of time before placing them in the container 12, and such premixing step is optional. Preferably, the glass components 22 comprise glass powder and the nanofibers 24 comprise carbon nanofibers. Preferably, the glass components 22 and the nanofibers 24 are chemically compatible. The method 300 further comprises step 304 of positioning one or more primary electrodes 44, 46, exterior to the glass components 22 in the mixture 20. The primary electrodes 44, 46, are preferably set to a desired value that will depend on the glass properties and the properties of the nanofibers. The method 300 further comprises step 306 of positioning one or more secondary electrodes 64 (see FIG. 2A) exterior to the glass components 22. The method 300 further comprises step 308 of placing the refractory container 12 in a vacuum chamber 66 and drawing or establishing a vacuum environment in the vacuum chamber 66 (see FIG. 2A). The 300 method further comprises step 310 of creating with the primary electrodes 44, 46, an electric field (E) in a volume (V) of the mixture 20 in order to orient the carbon nanofibers 24 along lines of the electric field (E). The method 300 further comprises step 312 of applying with the secondary electrodes 64 a body force (F) to the carbon nanofibers 24 in order to position the carbon nanofibers 24. The method 300 further comprises step 314 of energizing one or more heating elements 30 (see FIG. 2A) in order to heat the refractory container 12 to an effective temperature to melt the glass components 22 in the mixture 20 and to form a melted mixture 86 with the nanofibers and the melted glass components. The glass melting temperature is below the temperature at which the nanofibers decompose. Preferably, the effective temperature for heating the mixture is in a range of from about 800 degrees Celsius to about 2000 degrees Celsius. Preferably, the effective period of time to melt the glass components 22 in the mixture 20 is in a range of from about ten (10) minutes to about five (5) hours. The heating elements 30, as discussed above, may in one embodiment comprise a high-temperature heating device made of a material such as molybdenum disilicide, tungsten, molybdenum, silicon carbide, nichrome, or another suitable high-temperature heating material. Preferably, such heating elements 30 are in close proximity to one or more exterior portions 40 of the container 12. The heating elements 30, as discussed above and shown in FIGS. 6A and 6B, may in another embodiment comprise and an electrical source, such as a wire, that generates current such as a direct current (dc) passing through the container, an alternating current (ac) passing through the container, or a combination of a direct current (dc) and an alternating current (ac) passing through the container. The Joule heating created by passing the direct current, the alternating current, or a combination of the direct current and alternating current through the resistance of the container 12 may form the one or more heating elements 30 to supply the required heat to heat the mixture 20. After heating the container 12, the container 12 may be tilted so that a centerline 25 of the container 12 is at an angle in a range of from about 1 degree to about 20 degrees relative to a vertical axis of the container, and then the container may be rotated about its centerline. Alternately, the container may be a tilted container that is already tilted prior to heating, so that a centerline of the container is at an angle in a range of from about 1 degree to about 20 degrees relative to a vertical axis of the container. In another embodiment, after heating the container, the container may be tilted so that a centerline of the container is at a 90 degree angle relative to a vertical axis of the container. Alternately, the container may be a tilted container that is already tilted prior to heating, so that a centerline of the container is at a 90 degree angle relative to a vertical axis of the container.

The method 300 further comprises step 316 of degassing the melted mixture 86. Degassing is needed to prevent or minimize the formation of air bubbles in the glass preform, as the presence of air bubbles can create flaws in the fiber drawn from the glass preform. Any trapped gas 28 (see FIG. 2A) or air in the glass components 22 or glass powder can escape through the opening 26 in the container 12, and escape through the opening 60 in the insulation 52, and can be pumped out of the vacuum chamber 66 via the vacuum pump 76 and exit port 78 (see FIG. 2A). While the glass components 22 melt, all or most all of the trapped gas 28 or air eventually escapes from the apparatus 50, and the nanofibers 24 will orient themselves and find their equilibrium positions where the buoyancy force is balanced by the force of the electric field gradient. The method 300 further comprises step 318 of de-energizing the one or more heating elements 30 after an effective period of time. After sufficient time passes for both degassing and nanofiber positioning to take place, the heating elements 30 are turned off or deenergized and the melted mixture 86 is allowed to cool in a controlled manner, locking the nanofibers in place. The method 300 further comprises step 320 of cooling the melted mixture 86 in order to secure the carbon nanofibers in place within the melted glass components of the melted mixture 86 to form the solidified glass preform 150 (see FIG. 7) with carbon nanofiber reinforcement. The method 300 further comprises step 322 of removing the glass preform with carbon nanofiber reinforcement from the vacuum chamber 66 for further processing in a fiber drawing apparatus (not shown). There is also provided a glass preform, such as glass preform 150, with nanofiber reinforcement made by the method 300 described above.

Figure 10:
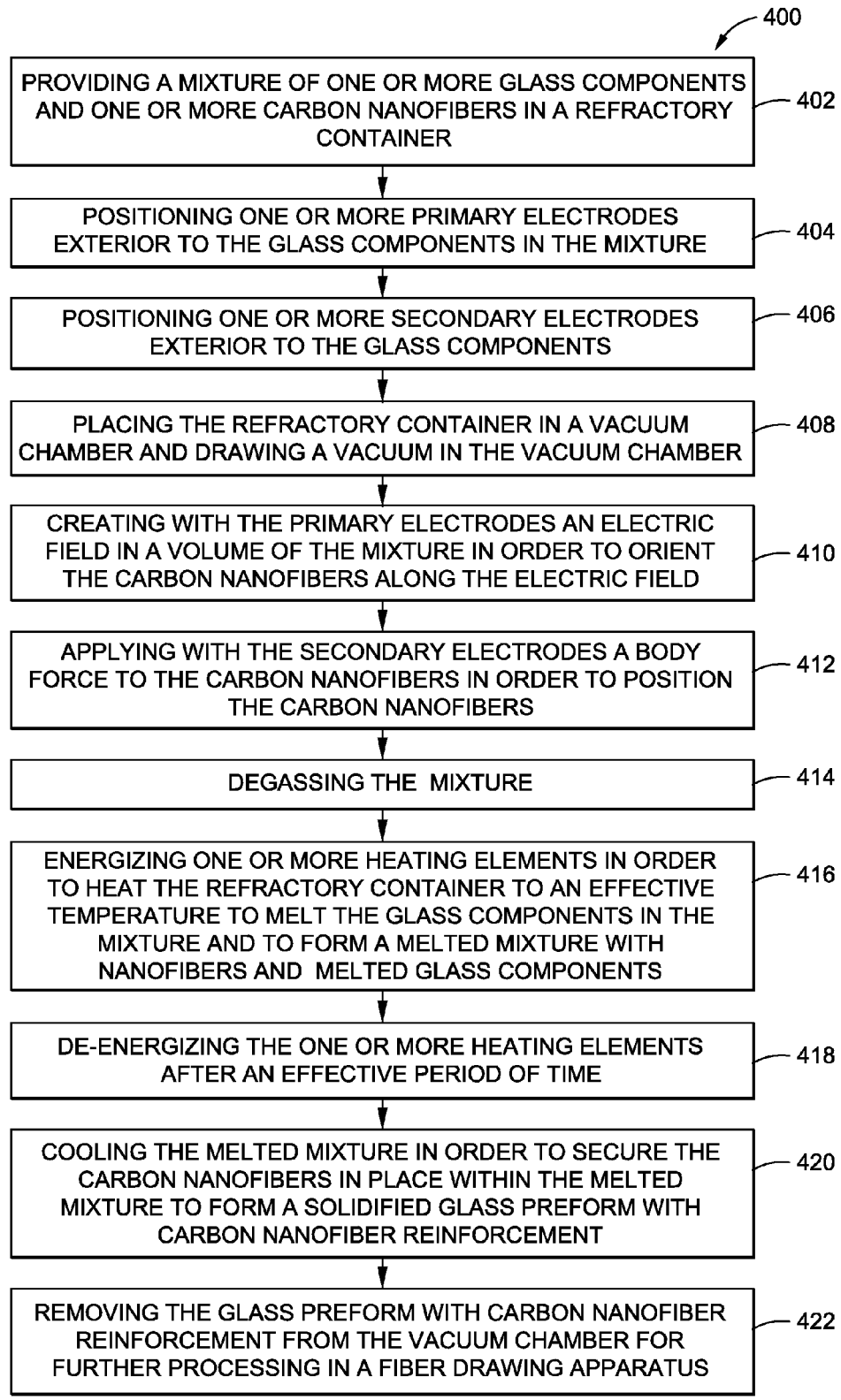

In an alternate embodiment of the method 300 discussed above, the degassing step may be performed prior to the heating step. FIG. 10 is an illustration of a flow diagram of this alternate embodiment of a method 400 of the disclosure for making one of the embodiments of the glass preform 150 (see FIG. 7) with nanofiber 24 reinforcement of the disclosure. The method 400 comprises step 402 of providing a mixture 20 (see FIG. 2A) of one or more glass components 22 and one or more carbon nanofibers 24 in a container 12, preferably a refractory container. The glass components 22 and the nanofibers 24 may be uniformly mixed ahead of time before placing them in the container 12, and such premixing step is optional. The method 400 further comprises step 404 of positioning one or more primary electrodes 44, 46, exterior to the glass components 22 in the mixture 20. The primary electrodes 44, 46, are preferably set to a desired value that will depend on the glass properties and the properties of the nanofibers. The method 400 further comprises step 406 of positioning one or more secondary electrodes 64 (see FIG. 2A) exterior to the glass components 22. The method 400 further comprises step 408 of placing the refractory container 12 in a vacuum chamber 66 and drawing or establishing a vacuum environment in the vacuum chamber 66 (see FIG. 2A). The 400 method further comprises step 410 of creating with the primary electrodes 44, 46, an electric field (E) in a volume (V) of the mixture 20 in order to orient the carbon nanofibers 24 along lines of the electric field (E). The method 400 further comprises step 412 of applying with the secondary electrodes 64 a body force (F) to the carbon nanofibers 24 in order to position the carbon nanofibers 24. The method 400 further comprises step 414 of degassing the mixture 20. The method 400 further comprises step 416 of energizing one or more heating elements 30 (see FIG. 2A), as discussed above, in order to heat the refractory container 12 to an effective temperature to melt the glass components 22 in the mixture 20 and to form a melted mixture 86 with the nanofibers and the melted glass components. After heating the container, the container may be tilted so that a centerline of the container is at an angle in a range of from about 1 degree to about 20 degrees relative to a vertical axis of the container, and then the container may be rotated about its centerline. Alternately, the container may be a tilted container that is already tilted prior to heating, so that a centerline of the container is at an angle in a range of from about 1 degree to about 20 degrees relative to a vertical axis of the container. In another embodiment, after heating the container, the container may be tilted so that a centerline of the container is at a 90 degree angle relative to a vertical axis of the container. Alternately, the container may be a tilted container that is already tilted prior to heating, so that a centerline of the container is at a 90 degree angle relative to a vertical axis of the container.

The method 400 further comprises step 418 of de-energizing the one or more heating elements 30 after an effective period of time. After sufficient heating, the heating elements 30 are turned off or deenergized and the melted mixture 86 is allowed to cool in a controlled manner, locking the nanofibers in place. The method 400 further comprises step 420 of cooling the melted mixture 86 in order to secure the carbon nanofibers in place within the melted glass components of the melted mixture 86 to form a solidified glass preform 150 (see FIG. 7) with carbon nanofiber reinforcement. The method 400 further comprises step 422 of removing the glass preform with carbon nanofiber reinforcement from the vacuum chamber 66 for further processing in a fiber drawing apparatus (not shown). There is also provided a glass preform, such as glass preform 150, with nanofiber reinforcement made by the method 400 described above.

Disclosed embodiments of the apparatus and method provide for homogeneous placement of aligned carbon nanofibers or nanotubes in degassed glass preforms. The resulting glass preform may be used as a component in a glass fiber drawing facility. Disclosed embodiments of the apparatus and method enable the creation of glass preforms with carbon nanofibers or nanotubes dispersed and aligned such that continuous lengths of high-strength glass nanofibers can be drawn from the preform, and further enable the production of high strength nanofibers with the tensile strength equal to or exceeding that of high strength carbon fiber but at a lower cost approximately that of producing glass fiber. The low-cost, high-strength fibers may be used in composite structures on airplanes, aircraft, rotorcraft, watercraft, and other composite structures. For example, an aircraft made with the apparatus and method disclosed herein can have an overall lower cost and an overall lower weight, thus reducing overall fuel use and allowing more passengers or cargo to be carried.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An apparatus for making a glass preform with nanofiber reinforcement, the apparatus comprising:
   a container for melting one or more glass components in a mixture comprising the glass components and one or more nanofibers, wherein the container is a tilted container such that the tilted container has a centerline that is tilted at an angle in a range of from about 1 degree to about 20 degrees relative to a horizontal axis of the apparatus;
   an opening in the container that allows escape of any gas released from the glass components when the glass components are melted in the container;
   one or more heating elements for heating the container; and,
   two or more electric field devices, positioned exterior to the glass components, positioned exterior to the container and oriented along the centerline of the container, that create an electric field in a volume of the mixture in order to orient the nanofibers within the glass components when the glass components are melted in the container.

2. The apparatus of claim 1, further comprising one or more electric field gradient devices, positioned exterior to the glass components and positioned exterior to the container, that apply a body force to the nanofibers to control the position of the nanofibers within the glass components when the glass components are melted in the container.

3. The apparatus of claim 2, wherein two electric field gradient devices are positioned exterior to the glass components and positioned exterior to the container.

4. The apparatus of claim 1, further comprising a vacuum chamber for housing the container, the heating elements, and the electric field devices, the vacuum chamber having a vacuum pump to pump the gas released from the glass components outside the vacuum chamber.

5. The apparatus of claim 1, further comprising one or more pieces of insulation surrounding one or more exterior portions of the heating elements and one or more exterior portions of the container.

6. The apparatus of claim 1, wherein the one or more heating elements are selected from the group comprising a high-temperature heating material selected from the group consisting of molybdenum disilicide, tungsten, molybdenum, and silicon carbide; and an electrical source that generates current selected from the group consisting of a direct current passing through the container, an alternating current passing through the container, and a combination of a direct current and an alternating current passing through the container.

7. The apparatus of claim 1, wherein the apparatus further comprises a rotation mechanism for rotating the container about its centerline.

8. The apparatus of claim 1, wherein the container is longer than a length of each heating element and has a centerline that is tilted at a 90 degree angle relative to a vertical axis of the apparatus prior to the glass components being melted in the container, and wherein the apparatus further comprises a moving device to move the container in a horizontal direction.

9. An apparatus for making a glass preform with carbon nanofiber reinforcement, the apparatus comprising:
   a refractory container for melting one or more glass components in a mixture comprising the glass components and one or more carbon nanofibers, wherein the container is a tilted container such that the tilted container has a centerline that is tilted at an angle in a range of from about 1 degree to about 20 degrees relative to a horizontal axis of the apparatus;
   an opening in the container that allows escape of any gas released from the glass components when the glass components are melted in the refractory container;
   one or more heating elements for heating the refractory container;
   one or more pieces of insulation surrounding one or more exterior portions of the heating elements and one or more exterior portions of the refractory container;
   two or more primary electrodes, positioned exterior to the glass components, positioned exterior to the container and oriented along the centerline of the container, that create an electric field in a volume of the mixture in order to orient the carbon nanofibers within the glass components when the glass components are melted in the refractory container;
   one or more secondary electrodes, positioned exterior to the glass components and positioned exterior to the container, that apply a body force to the carbon nanofibers to control the position of the carbon nanofibers within the glass components when the glass components are melted in the refractory container; and,
   a vacuum chamber for housing the refractory container, the heating elements, the primary electrodes, and the secondary electrodes, the vacuum chamber having a vacuum pump to pump the gas released from the glass components outside the vacuum chamber.

10. The apparatus of claim 9, wherein the one or more heating elements are selected from the group comprising a high-temperature heating material selected from the group consisting of molybdenum disilicide, tungsten, molybdenum, and silicon carbide; and an electrical source that generates current selected from the group consisting of a direct current passing through the container, an alternating current passing through the container, and a combination of a direct current and an alternating current passing through the container.

11. The apparatus of claim 9, wherein two secondary electrodes are positioned exterior to the glass components and positioned exterior to the container.

12. The apparatus of claim 9, wherein the apparatus further comprises a rotation mechanism for rotating the container about its centerline.

13. The apparatus of claim 9, wherein the refractory container is longer than a length of each heating element and has a centerline that is tilted at a 90 degree angle relative to a vertical axis of the apparatus prior to the glass components being melted in the refractory container, and wherein the apparatus further comprises a moving device to move the container in a horizontal direction.

14. The apparatus of claim 9, wherein the opening in the container is not concentric with an opening in the insulation and the centerline of the container.

15. The apparatus of claim 9, wherein the opening in the container and an opening in the insulation are concentric with the centerline of the container and keep the mixture below a bottom edge of the opening of the container.

* * * * *